US012710860B2

(12) United States Patent
Kohli et al.

(10) Patent No.: US 12,710,860 B2
(45) Date of Patent: Aug. 18, 2026

(54) SYSTEM AND METHOD TO TRANSFORM AUDIO DATA

(71) Applicant: Bank of America Corporation, Charlotte, NC (US)

(72) Inventors: Apoorv Kohli, Bensalem, PA (US); Jitender Singh, Robbinsville, NJ (US); Mark Ralf Schledzewski, Erie, CO (US); Jennifer Corzo, Ewing, NJ (US); Sapna Yadav, Gandhinagar (IN); Hasana Chaudry, Linden, NJ (US); Priyeshkumar Patel, Hillsborough, NJ (US)

(73) Assignee: Bank of America Corporation, Charlotte, NC (US)

( * ) Notice: Subject to any disclaimer, the term of this patent is extended or adjusted under 35 U.S.C. 154(b) by 137 days.

(21) Appl. No.: 18/750,399

(22) Filed: Jun. 21, 2024

(65) Prior Publication Data

US 2025/0390200 A1 Dec. 25, 2025

(51) Int. Cl.

*G10L 15/26* (2006.01)
*G06F 3/0484* (2022.01)
*G06F 40/30* (2020.01)

(52) U.S. Cl.

CPC ............ *G06F 3/0484* (2013.01); *G06F 40/30* (2020.01)

(58) Field of Classification Search

None

See application file for complete search history.

(56) References Cited

U.S. PATENT DOCUMENTS 8,744,524 B2 6/2014 Schell
10,990,460 B2 4/2021 Pei et al.
11,157,706 B2 10/2021 Ayers et al.
11,240,181 B1 2/2022 Nagaraja et al.
11,373,045 B2 6/2022 Bealby-Wright et al.

(Continued)

FOREIGN PATENT DOCUMENTS

CN 1812442 A 8/2006
CN 102332949 B 1/2015

(Continued)

OTHER PUBLICATIONS

Live UI, website, Dec. 13, 2022, https://docs-previous.pega.com/user-experience/86/live-ui.

*Primary Examiner* — Neeraj Sharma

(57) ABSTRACT

A system comprises a memory communicatively coupled to at least one processor. The at least one processor is configured to obtain audio data from a user device. Further, in response to receiving the audio data, the processor is configured to execute a machine learning algorithm to transcribe the audio data into text data and summarize the text data into a data summary. The data summary is representative of a predicted intent associated with the audio data. The processor is configured to determine an interface property based on the data summary in response to summarizing the text data. The interface property is one or more communication commands to interact with the data summary. The processor is configured to determine an interface control based on the data summary and the interface property, bind the interface property to a rendered interface control, and present the rendered interface control to a workspace device.

20 Claims, 3 Drawing Sheets

(56) References Cited

U.S. PATENT DOCUMENTS

| | | | |
|---|---|---|---|
| 11,507,756 B2 | 11/2022 | Lima et al. | |
| 11,556,862 B2 | 1/2023 | Polleri et al. | |
| 11,663,523 B2 | 5/2023 | Polleri et al. | |
| 11,862,148 B2 | 1/2024 | Sivasubramanian et al. | |
| 11,922,118 B2 | 3/2024 | Dunn et al. | |
| 12,106,757 B1 * | 10/2024 | Chandran | G10L 15/22 |
| 12,592,017 B2 * | 3/2026 | Harpale | G06T 13/205 |
| 2002/0007483 A1 * | 1/2002 | Lopez | G06F 8/31 717/122 |
| 2007/0287479 A1 | 12/2007 | Kim | |
| 2017/0111513 A1 | 4/2017 | Ye | |
| 2020/0364067 A1 * | 11/2020 | Accame | G10L 15/22 |
| 2021/0157834 A1 | 5/2021 | Sivasubramanian et al. | |
| 2022/0199079 A1 * | 6/2022 | Hanson | H04L 51/02 |
| 2023/0128422 A1 * | 4/2023 | Li | G10L 15/24 345/156 |
| 2023/0223031 A1 * | 7/2023 | Sharifi | G10L 17/24 704/246 |
| 2023/0245651 A1 | 8/2023 | Wang | |
| 2024/0020968 A1 * | 1/2024 | Haskin | G06F 16/29 |
| 2024/0143065 A1 * | 5/2024 | Lal | G06F 3/011 |
| 2025/0077549 A1 * | 3/2025 | George | G06F 16/287 |
| 2025/0245257 A1 * | 7/2025 | Ganju | G10L 13/08 |
| 2025/0340118 A1 * | 11/2025 | Whinnery | G06F 21/30 |

FOREIGN PATENT DOCUMENTS

| | | |
|---|---|---|
| CN | 204231483 U | 3/2015 |
| JP | 2009258529 A | 11/2009 |

* cited by examiner

SYSTEM AND METHOD TO TRANSFORM AUDIO DATA

TECHNICAL FIELD

The present disclosure relates generally to sound analysis, and more specifically to a system and method to transform audio data.

BACKGROUND

In communication systems, multiple devices may perform communication operations with one another. In certain communication systems, the communication operations may be data exchanges performed between two or more devices. The communication operations may consume (e.g., use) network resources each time data is exchanged. The network resources may comprise power resources, memory resources, and/or processing resources. Several network resources may be consumed in processes comprising lengthier communication operations lasting multiple minutes. Further, several resources may be consumed in processes comprising larger data exchanges in which multiple information packets are exchanged.

SUMMARY OF THE DISCLOSURE

In one or more embodiments, systems and methods are configured to transform audio data. In particular, the systems are configured to dynamically generate interface controls based on audio data exchanged between a user device and a workspace device. The user device and the workspace device may be configured to exchange data while performing one or more communication operations. The systems may be configured to provide the interface controls to the workspace device based on information obtained in one or more of the communication operations. As interface properties and corresponding interface controls are presented to the workspace device, the workspace device may be configured to perform one or more action item via the generated interface controls. In some embodiments, the systems may be configured to identify communication operations performed between two or more devices in a communication network. The communication operations may comprise one or more data exchanges between the two or more devices. In some embodiments, the data exchanged may be audio data. Herein, the systems may be configured to execute one or more machine learning algorithms to obtain the audio data exchanged and perform one or more transcriptions on the audio data. As part of the transcription operations, the systems may be configured to generate image data and/or text data based at least in part upon the audio data. After the audio data is transcribed, the image data and/or the text data may be dynamically summarized to obtain a predicted intent of the communication operations. At this stage, the systems are configured to determine one or more interface properties based on the predicted intent determined of the communication operations. The one or more interface properties may be one or more visualization commands to visualize data representative of the predicted intent in a virtual environment. The systems may be configured to generate one or more interface controls based on the predicted intent and the interface properties, render the interface controls in a virtual environment, and bind the interface controls to the interface properties. The virtual environment may be a simulated environment and/or a user interface. In some embodiments, the systems are configured to present the suggestions to a workspace device comprising the virtual environment.

In one or more embodiments, the systems and methods described herein are integrated into a practical application of dynamically determining intent behind information shared in communication operations and creating virtual elements configured to provide knowledge relating to the intent and/or provide additional insight regarding the intent. In one or more embodiments, the information shared may be processed as audio data exchanged between two or more devices in real time. In this regard, real time may refer to smaller delays (e.g., milliseconds, nanoseconds, and the like) between processing time after the audio data is obtained. The audio data may be transcribed into text data and/or image data. Herein, a machine learning algorithm may be configured to structure the transcribed data in accordance with one or more machine learning models, determine motivation from the structured version of the transcribed data, and generate one or more intents based at least in part upon the structured version of the transcribed data. In some embodiments, the systems and methods are integrated into a practical application of actively determining one or more interfaces configured to receive one or more interactions based on summarized versions of the audio data. For example, in an educational setting, the systems may be configured to generate one or more summaries based on the contents of a lecture. As a presenter (e.g., a professor) describes information relating to one or more elements of a subject, the systems may be configured to summarize the information into one or more key points. Then, the system may be configured to determine, upon executing the machine learning algorithm, a more appropriate presentation of the key points (e.g., charts, graphs, drawings, and the like), determine possible actions associated with the appropriate presentation (e.g., ability to click in a data point to provide context to the information), render the presentation in a virtual environment, and bind the possible actions to the presentation to enable users to interact with the visual representation of the audio data.

In one or more embodiments, the systems and methods are directed to improvements in computer systems. Specifically, the systems and methods reduce processor and memory usage in a server by reducing network resources consumed during communication operations. The communication operations may consume (e.g., use) network resources each time data is exchanged. The network resources may comprise power resources, memory resources, and/or processing resources. Herein, the systems and methods reduce consumption of network resources because communication operations are made more efficient. As intent behind the communication operations is determined in real time, visual representation suggestions (e.g., interface controls) may be determined and rendered to provide a workspace device with real time feedback of an ongoing data exchange. After a visual representation suggestion is generated, one or more interface properties may be determined and coupled to the visual representations in the workspace device.

In one or more embodiments, the systems may comprise an apparatus, such as the server. Further, the system may be a data exchange system, that comprises the apparatus. In addition, the system may be configured to perform operations as part of a process performed by the apparatus. As a non-limiting example, the system may comprise a memory and at least one processor communicatively coupled to one another. The memory may be operable to store a machine learning algorithm configured, when executed, to evaluate data in conjunction with one or more machine learning models. The at least one processor may be configured to obtain audio data from a user device. Further, in response to receiving the audio data, the processor may be configured to execute the machine learning algorithm to transcribe the audio data into text data and summarize the text data into a data summary. The data summary may be representative of a predicted intent associated with the audio data. The processor may be configured to determine an interface property based on the data summary in response to summarizing the text data. The interface property may be one or more communication commands to interact with the data summary. The processor may be configured to determine an interface control based on the data summary and the interface property. The interface control may be one or more visualization commands to visualize the data summary in a virtual environment. The processor may be configured to render the interface control in the virtual environment, bind the interface property to the interface control, and present the interface control to a workspace device.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
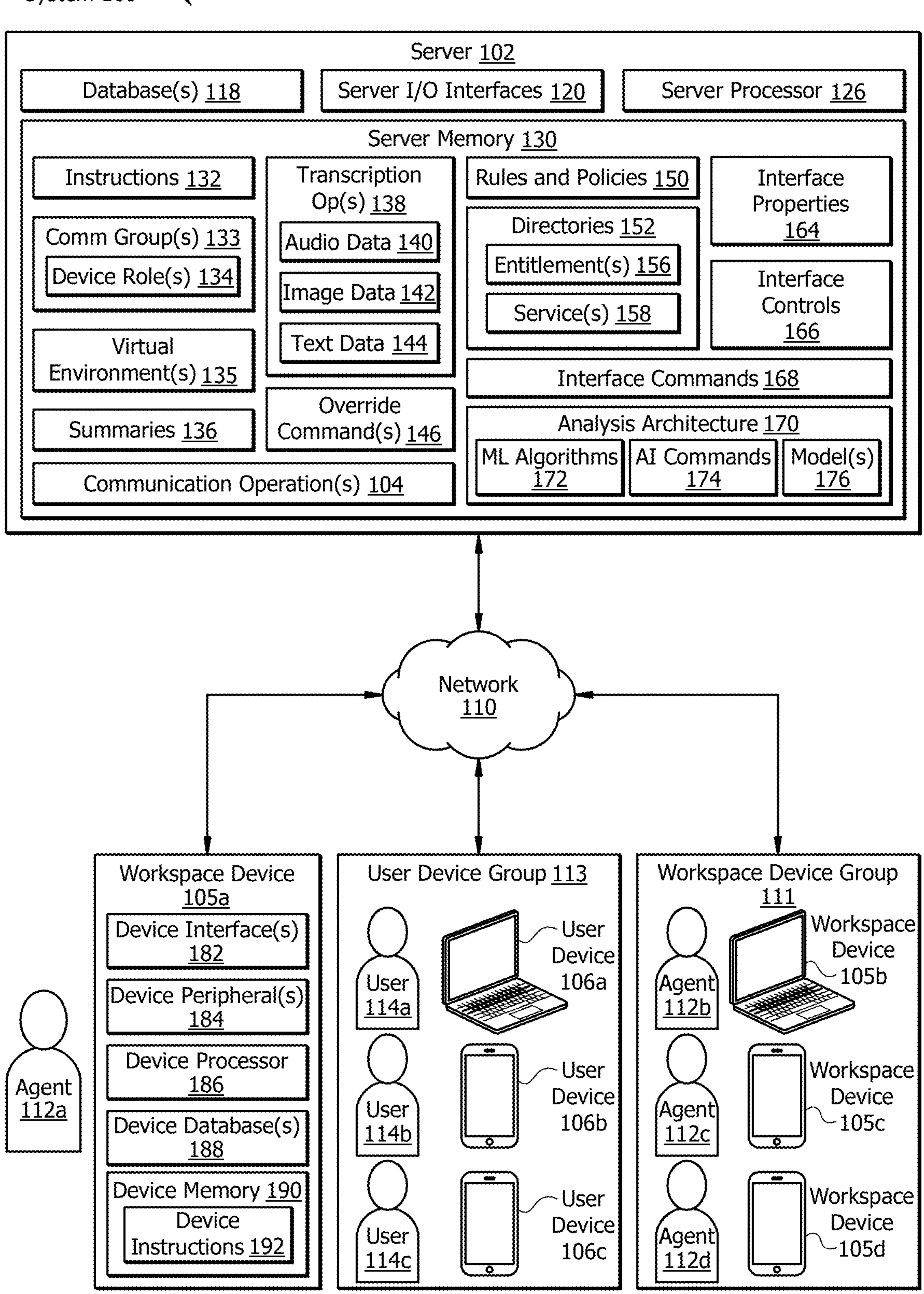
FIG. 1 illustrates a system in accordance with one or more embodiments.
Figure 2:
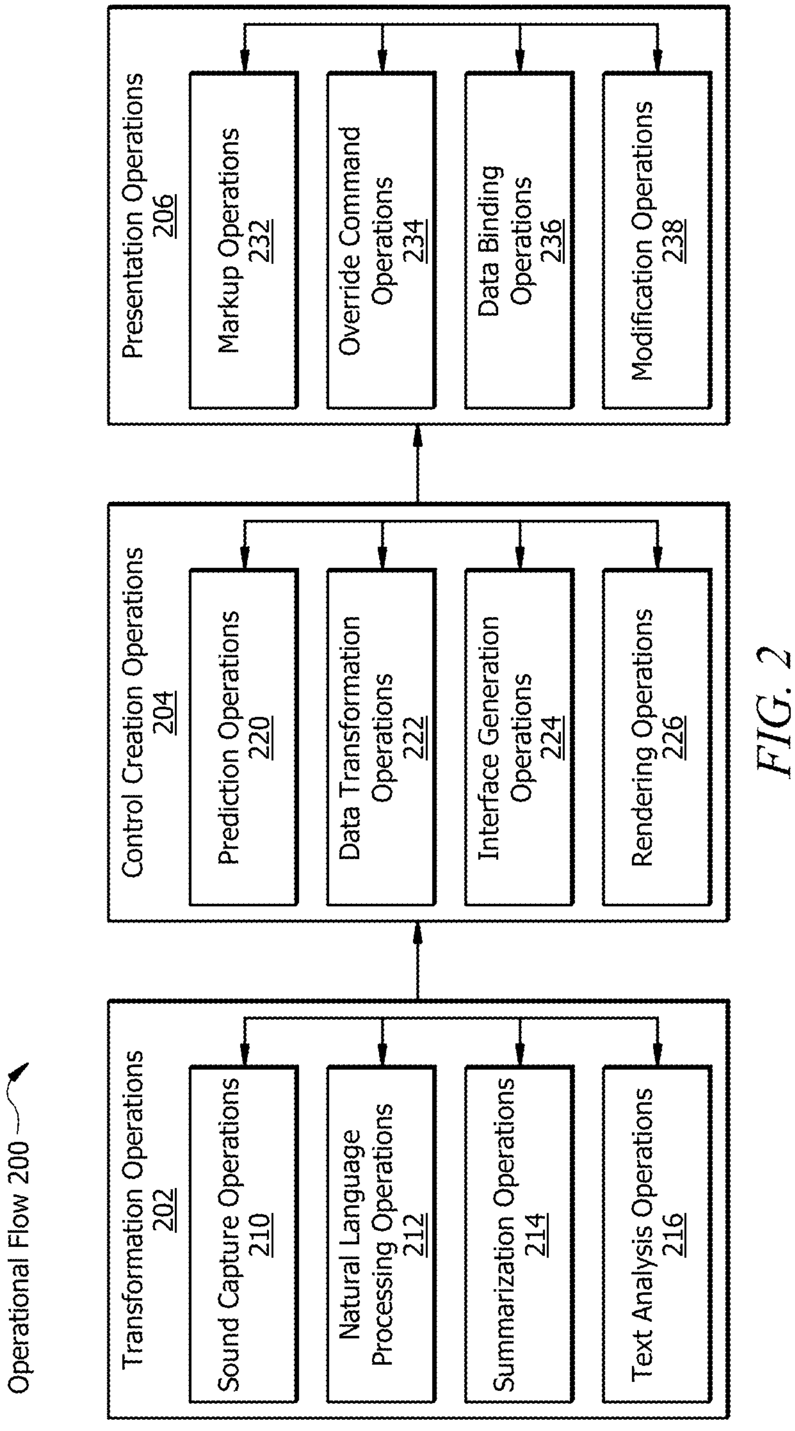
FIG. 2 illustrates an operational flow to transform audio data in accordance with one or more embodiments.
Figure 3:
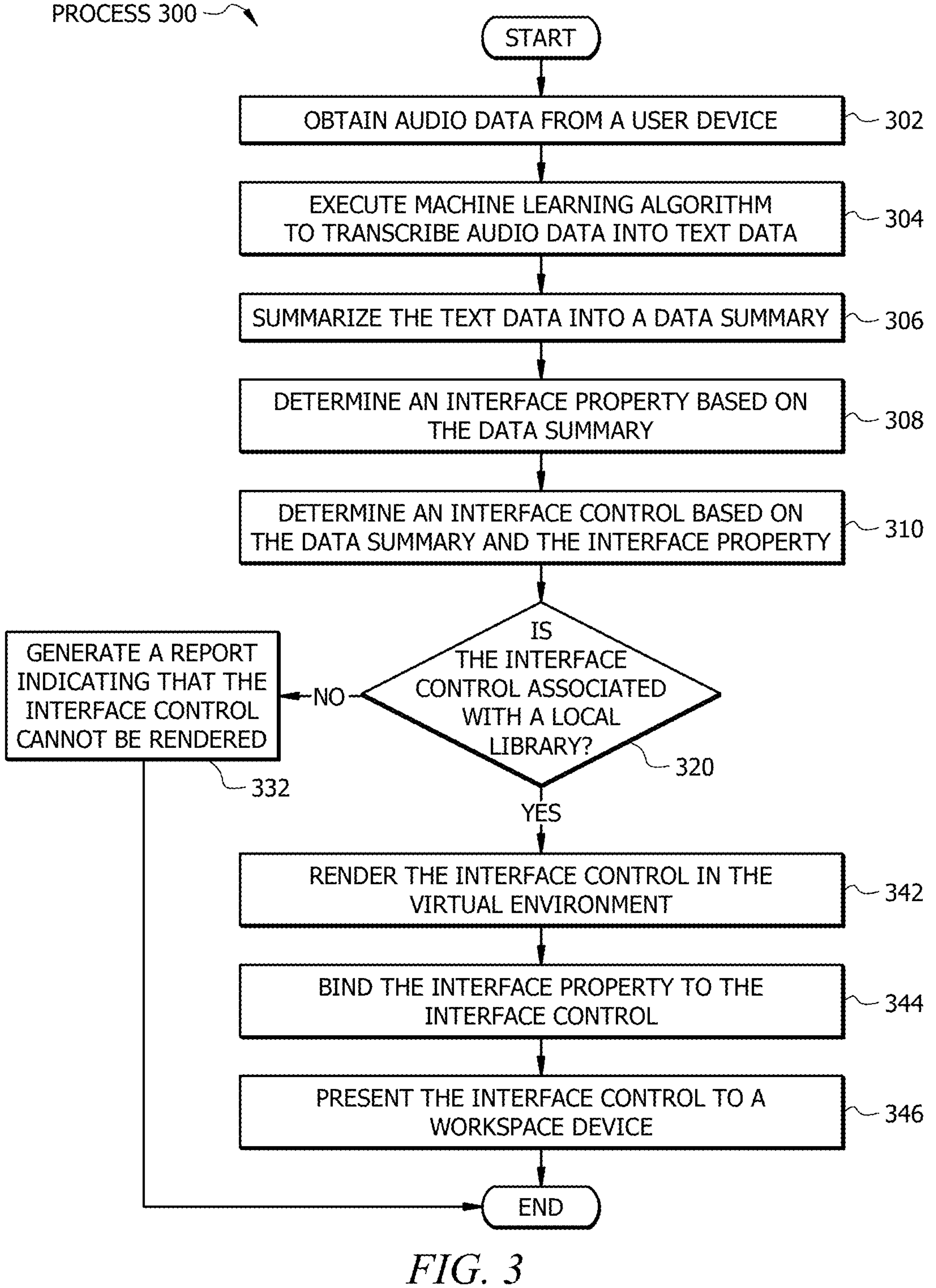
FIG. 3 illustrates an example flowchart of a method to perform the operational flow of FIG. 2 in accordance with one or more embodiments.

As described above, this disclosure provides various systems and methods to transform audio data. FIG. 1 illustrates a system 100 in which a server 102 configured to analyze one or more communication operations 104. FIG. 2 illustrates an operation flow 200 performed by the system 100 of FIG. 1. FIG. 3 illustrates a process 300 performed by the system 100 of FIG. 1.

System Overview

FIG. 1 illustrates a system 100 comprising a server 102 configured to analyze communication operations 104. In the system 100 of FIG. 1, the server 102 is communicatively coupled to multiple workspace devices 105*a*-105*d* (collectively, workspace devices 105) and multiple user devices 106*a*-106*c* (collectively, user devices 106) via a network 110. In some embodiments, the workspace device 105*a* is a standalone device, while the workspace device 105*b*, the workspace device 105*c*, and the workspace device 105*d* may be incorporated in a workspace device group 111. Each of the workspace device 105*a*, the workspace device 105*b*, the workspace device 105*c*, and the workspace device 105*d* may be operated by an agent 112*a*, an agent 112*b*, an agent 112*c*, and an agent 112*d*, respectively. The workspace device group 111 may comprise less or more workspace devices 105 than those shown in FIG. 1. Further, the user device 106*a*, the user device 106*b*, and the user device 106*c* may be incorporated in a user device group 113. Each of the user device 106*a*, the user device 106*b*, and the user device 106*c* may be operated by a user 114*a*, a user 114*b*, and a user 114*c*, respectively. The user device groups 113 may comprise less or more user devices 106 than those shown in FIG. 1.

In one or more embodiments, the server 102 comprises the databases 118, a server input (I)/output (O) interfaces 120, at least one server processor 126 comprising a processing engine (not shown), and a server memory 130. In some embodiments, the databases 118 may be standalone memory storage units or part of the server memory 130. In some embodiments, the server memory 130 may comprise instructions 132, one or more communication groups 133 associating one or more device roles 134, one or more virtual environments 135, one or more summaries 136, the one or more communication operations 104, one or more transcription operations 138 transcribing audio data 140 into image data 142 and/or text data 144, one or more override commands 146, one or more rules and policies 150, one or more directories 152 comprising one or more entitlements 156 to access one or more services 158, one or more interface properties 164, one or more interface controls 166, one or more interface commands 168, and information associated with an analysis architecture 170 comprising one or more machine learning (ML) algorithms 172 and one or more artificial intelligence (AI) commands 174 configured to train and/or perform one or more operations in accordance with one or more ML models 176.

Referring to the workspace device 105*a* as a non-limiting example of the workspace devices 105, the workspace devices 105 may comprise one or more device interfaces 182, one or more device peripherals 184, a device processor 186, and a device memory 190. The device memory 190 may comprise multiple device instructions 192, multiple local operation data, and one or more local applications. The user devices 106 may comprise one or more elements and/or components described in reference to the workspace device 105*a*.

System Components

Server

The server 102 is generally any device or apparatus that is configured to process data and communicate with computing devices (e.g., the workspace devices 105 and/or the user devices 106), additional databases, systems, and the like, via the one or more server I/O interfaces 120 (i.e., a user interface or a network interface). The server 102 may comprise the server processor 126 that is generally configured to oversee operations of the processing engine. The operations of the processing engine are described further below in conjunction with the system 100 described in FIG. 1, the operation flow 200 described in FIG. 2, and the process 300 described in FIG. 3.

The server 102 comprises multiple databases 118 configured to provide one or more memory resources to the server 102, the workspace devices 105, and/or and the user devices 106. The server 102 comprises the server processor 126 communicatively coupled with the databases 118, the server I/O interfaces 120, and the server memory 130. The server 102 may be configured as shown, or in any other configuration. In one or more embodiments, the databases 118 are configured to store data that enables the server 102 to configure, manage and coordinate one or more middleware systems. In some embodiments, the databases 118 store data used by the server 102 to function as a halfway point in between applications and other tools or databases.

In one or more embodiments, the databases 118 may be one of the server databases in one of the managed servers. In one example, the server 102 may determine the server processor 126 is available (e.g., running) to perform a specific server application (e.g., service). In another example, the server 102 may determine that a specific managed server is running to perform a specific server application after receiving a server response indicating that a corresponding managed server is available to perform the server application. In one or more embodiments, the server 102 may determine whether a specific device processor 186 is available (e.g., running) to perform one or more specific local applications. In yet another example, the server 102 may determine that the databases 118 are running to provide memory resources to execute server applications receiving a database response indicating that the databases 118 are available to provide memory resources to execute the server applications. In one or more embodiments, the server 102 may determine whether the databases 118 are available (e.g., running) and may provide the database response. In one or more embodiments, one of the managed servers may determine whether the corresponding databases 118 are available (e.g., running) and may provide the database response.

In one or more embodiments, the server I/O interfaces 120 may be configured to enable wired and/or wireless communications. The server I/O interfaces 120 may be configured to communicate data between the server 102 and other devices (i.e., the workspace devices 105 and/or the user devices 106), network devices (i.e., routers in the network 110), systems, or domain(s) via the network 110. For example, the server I/O interfaces 120 may comprise a WI-FI interface, a LAN interface, a WAN interface, a modem, a switch, or a router. The server processor 126 may be configured to send and receive data using the server I/O interfaces 120. The server I/O interfaces 120 may be configured to use any suitable type of communication protocol. In some embodiments, the server I/O interfaces 120 may be an admin console comprising a display configured to show a user interface used to manage a middleware server domain via the server 102. A middleware server domain may be a logically related group of middleware server resources that managed as a unit. A middleware server domain may comprise the server 102 and one or more managed servers. The managed servers may be standalone devices and/or collected devices in a server cluster. The server cluster may be a group of managed servers that work together to provide scalability and higher availability for server applications. In this regard, the server applications are developed and deployed as part of at least one domain. In other embodiments, one instance of the managed servers in the middleware server domain may be configured as the server 102. The server 102 provides a central point for managing and configure the managed servers, any of the one or more server applications and the one or more local applications.

The at least one server processor 126 may comprise one or more processors communicatively coupled to the server memory 130. The server processor 126 may be any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The server processor 126 may be a programmable logic device, a microcontroller, a microprocessor, or any suitable combination of the preceding. The one or more server processors 126 may be configured to process data and may be implemented in hardware or software executed by hardware. For example, the server processor 126 may be 8-bit, 16-bit, 32-bit, 64-bit or of any other suitable architecture. The server processor 126 may include an arithmetic logic unit (ALU) for performing arithmetic and logic operations, processor registers that supply operands to the ALU and store the results of ALU operations, and a control unit that fetches the instructions 132 from the server memory 130 and executes them by directing the coordinated operations of the ALU, registers and other components. In this regard, the one or more server processors 126 are configured to execute various instructions. For example, the one or more server processors 126 are configured to execute the instructions 132 to implement the functions disclosed herein, such as some or all of those described with respect to FIGS. 1-3. In some embodiments, the functions described herein are implemented using logic units, FPGAs, ASICs, DSPs, or any other suitable hardware or electronic circuitry.

In one or more embodiments, the server I/O interfaces 120 may be any suitable hardware and/or software to facilitate any suitable type of wireless and/or wired connection. These connections may include, but not be limited to, all or a portion of network connections coupled to the Internet, an Intranet, a private network, a public network, a peer-to-peer network, the public switched telephone network, a cellular network, a local area network (LAN), a metropolitan area network (MAN), a wide area network (WAN), and a satellite network. The server I/O interfaces 120 may be configured to support any suitable type of communication protocol as would be appreciated by one of ordinary skill in the art.

The server memory 130 may be volatile or non-volatile and may comprise a read-only memory (ROM), random-access memory (RAM), ternary content-addressable memory (TCAM), dynamic random-access memory (DRAM), and static random-access memory (SRAM). The server memory 130 may be implemented using one or more disks, tape drives, solid-state drives, and/or the like. The server memory 130 is operable to store the instructions 132, the one or more communication groups 133 associating the one or more device roles 134 with the virtual environments 135, the one or more summaries 136, the one or more communication operations 104, the one or more transcription operations 138 transcribing stored and/or dynamically obtained audio data 140 into image data 142 and/or text data 144, the one or more override commands 146, the one or more rules and policies 150, the one or more directories 152 comprising the one or more user profiles and/or agent profiles associated with the one or more entitlements 156 to access the one or more services 158, the one or more interface properties 164, the one or more interface controls 166, the one or more interface commands 168, information associated with the analysis architecture 170 comprising the one or more ML algorithms 172 and the one or more AI commands 174 configured to train and/or perform one or more operations in accordance with the one or more ML models 176, and/or any other data or instructions. The instructions 132 may comprise any suitable set of instructions, logic, rules, or code operable to execute the server processor 126.

The communication groups 133 may be one or more configuration commands configured to associate one or more of the workspace devices 105 with one or more specific roles 134 within an organization. The communication groups 133 may comprise access commands to one or more network resources indexed in specific namespaces and pods in a communication system. The network resources may be memory resources, processing resources, and/or power resources that one or more of the workspace devices 105 are configured to access in a process to perform one or more communication operations 104. The communication groups 133 may be one or more virtual spaces associated with one or more specific agents 112. In this regard, the communication groups 133 may be customer service representative (CSR) workspaces configured to communicate with one or more user devices 106 associated with one or more users 114. The device roles 134 may provide the workspace devices 105 with one or more guidelines and/or configuration parameters to perform one or more of the communication operations 104. For example, first device roles 134*a* may indicate that the workspace device 105*a* is configured to access a first database 118*a* and second device roles 134*b* may indicate that the workspace device 105*b* is configured to access a second database 118*b* that is different from the first database 118*a*. The virtual environments 135 may be one or more spaces associated with protocols and/or communication procedures that guide interactions (e.g., sound and/or visual communications) between the server 102, one or more of the workspace devices 105, and/or one or more of the user devices 106. The virtual environments 135 may be configured to provide access between the directories 152 and one or more of the workspace devices 105. In one or more embodiments, the virtual environments 135 may be virtual spaces in which the interface controls 166 are presented.

The one or more communication operations 104 may be one or more data exchanges performed between two or more network devices in the system 100. The network devices may comprise the server 102, one or more of the workspace devices 105, and one or more of the user devices 106 among others. In one or more embodiments, the communication operations 104 may be audio communications exchanged as part of audio conversations (e.g., during a telephonic call) between two or more network devices. The communication operations 104 may be image and/or text communications exchanged as part of image-based conversations (e.g., during videocalls and/or chat exchanges) between two or more network devices.

The transcription operations 138 may be one or more operations to transcribe audio data 140 into image data 142 and/or text data 144. The audio data 140 may be obtained from audio signaling exchanges between network devices in the system 100. The audio data 140 may be an audio signature representative of one or more speech patterns and/or human sounds comprising a frequency range of 10 Hertz (Hz) to 30 kilohertz (kHz), inclusive. The audio data 140 may be any sound exchanged between two or more network devices. In one or more embodiments, the image data 142 may be codified images comprising one or more machine-readable codes representative of the audio data 140. The text data 144 may be letters and/or numbers. In one or more embodiments, the transcription operations 138 may be performed as part of one or more speech-to-text transcription operations 138 in real time as sounds are shared between two or more network devices. For example, the server 102 may be configured to transcribe audio data 140 exchanged between one of the workspace devices 105 (e.g., the workplace device 105*a*) and one of the user devices 106 (e.g., the user device 106*a*) in real time and/or near-real time.

In one or more embodiments, the server 102 may be configured to identify a communication operation 104 in which an audio stream is exchanged between one of the workspace devices 105 (e.g., the workplace device 105*a*) and one of the user devices 106 (e.g., the user device 106*a*). Herein, the server 102 may be configured to determine audio data 140 in the audio stream and dynamically transcribe the audio data 140 into image data 142 and/or text data 144. The transcription operations 138 may be performed after executing one or more ML algorithms 172 and one or more AI commands 174 trained in accordance with one or more ML models 176 in an analysis architecture. In turn, the transcribed data may be provided to an intelligent conversation hub (ICH) configured to structure and analyze the transcribed data. In some embodiments, the transcribed data may be a transcript showing lines of text or any other suitable combination of images and/or text. The ICH may be a conversation management framework that considers information in the directories 152 in accordance with a natural language understanding system to determine intent behind a user 114*a* associated with a user device 106*a*.

In one or more embodiments, the server 102 may be configured to execute the ML algorithm 172 to generate one or more summaries 136 based on the image data 142 and/or the text data 144. The summaries 136 may be one or more brief call purpose summaries indicating possible motivation behind statements in the audio data 140. The summaries 136 may be evaluated in accordance with a classification model to determine an intent related to statements in the audio data 140. The image data 142 and/or the text data 144 may be analyzed in accordance a language model (e.g., such as the Bidirectional and Auto-Regressive Transformer (BART)) to perform one or more summarization processes. In some embodiments, each of the summaries 136 may be a request summary in text data 144. The request summary may be representative of a predicted purpose behind a specific communication operation 104 associated with the audio data 140. The summaries 136 may be representative of predicted intents associated with the audio data 140. The summaries 136 may be representative of one or more intents to perform a specific communication operation 104. The summaries 136 may comprise one or more action items to be performed to at least partially fulfill the intent associated with the audio data 140.

The override commands 146 may be services that execute one or more actions after identifying a trigger from the server 102. The override commands 146 may be configured to provide overriding triggers in the communication operations 104 between the workspace devices 105 and the services 158. For example, a workspace device 105*a* may be configured to generate one or more action item suggestions based on intentions determined behind communication operations 104 performed by one or more network devices. In some embodiments, override commands 146 may be provided to one or more of the workspace devices 105. In turn, a given workspace device 105*a* may be configured to perform the suggested action item as defined by the one or more override commands 146. For example, after one or more interface controls 166 are generated, the one or more override commands 146 may be configured to modify one or more of the interface properties 164 and/or the interface controls 166.

The rules and policies 150 may be security configuration commands or regulatory operations predefined by an organization or one or more users 114. In one or more embodiments, the rules and policies 150 may be dynamically defined by the one or more users 114. The rules and policies 150 may be prioritization rules configured to instruct the server 102, the one or more user devices 106, and/or the one or more workspace devices 105 to perform one or more audio analysis operations or perform one or more communication operations 104 in the system 100. The one or more rules and policies 150 may be predetermined or dynamically assigned by a corresponding user 114, a corresponding agent 112, and/or an organization associated with the users 114 and/or the agents 112.

The directories 152 may comprise the one or more user profiles and/or agent profiles, one or more entitlements 156, and one or more services 158. In one or more embodiments, the user profiles and/or agent profiles may comprise multiple profiles associated with one or more entitlements 156 to access and/or modify the services 158. Each of the user profiles and/or agent profiles may be associated with one or more entitlements 156. The entitlements 156 may indicate that a given user device 106 is allowed to access one or more network resources in accordance with the one or more rules and policies 150. The entitlements 156 may indicate that a given user device 106 is allowed to perform one or more operations in the system 100 (e.g., provide a specific application data access to one of the users 114). To secure or protect operations of the user devices 106 from bad actors, the entitlements 156 may be assigned to a given user profile and/or agent profiles in accordance with updated security information, which may provide guidance parameters to the use of the entitlements 156 based at least upon corresponding rules and policies 150. In one or more embodiments, the one or more services 158 are access to one or more application operations performed in accordance with the application data. In some embodiments, the user profiles and/or agent profiles may comprise multiple profiles for users (e.g., user 114). Each user profile and/or agent profiles may comprise one or more entitlements 156. As described above, the entitlements 156 may indicate that a given user 114 is allowed to access one or more network resources in accordance with one or more rules and policies 150. The entitlements 156 may indicate that a given user is allowed to perform one or more data exchanges in the system 100. In one or more embodiments, each of the user profiles and/or agent profiles may comprise information about at least one user 114 entitled to trigger one or more data exchange operations and/or communication operations 104.

In one or more embodiments, the audio data 140 received from a user device 106*a* may be handled by a voice gateway configured to forward audio streams to a speech-to-text model. The text-to-speech model may be an ML model 176 configured to filter out background noise in an audio stream and identify human speech and execute an ML algorithm 172 to transcribe the audio data 140 associated with the human speech. The transcribed version of the audio data 140 may be image data 142 and/or text data 144. At this stage, the ML algorithm 172 may be executed in accordance with a call purpose summarization model to summarize the transcribed data and generate one or more summaries 136 as a result. The ML algorithms 172 may be executed in accordance with a classification model to determine information and/or communication categories associated with the audio data 140. The ML algorithms 172 may be configurated to evaluate the summaries 136 in accordance with a Named Entity Recognition (NER) model to extract entities (e.g., names, dates, accounts, amounts, numbers, and the like) from the summaries 136.

In one or more embodiments, the server 102 is configured to identify one or more communication operations 104, determine audio data 140 in the communication operations 104, and generate one or more summaries 136 based on the audio data 140. The summaries 136 may be configured to represent a purpose behind the audio data 140. As the communication operations 104 continue, subsequent audio data 140 is used to generate additional summaries 136. For each of the summaries 136, the server 102 may be configured to determine one or more intents from at least a portion of the communication operations 104. As the summaries 136 are obtained, additional intents may be determined over time. As each of the intents are determined, the server 102 may be configured to evaluate each of the intents to identify potential action item suggestions with respect to a starting point (e.g., a starting intent). At a time when the server 102 starts obtaining the audio data 140, a first intent associated with a first action item may be the starting point.

In one or more embodiments, as new intents are determined, if a new intent is determined to be mapped to one or more interface controls 166, then the new intent is referenced as a reset point to evaluate subsequent intents to map to additional interfaces. In this regard, the server 102 may be configured to dynamically determine and/or predict an intent and determine whether the intent may be mapped to an interface based on the predicted intent of specific audio data 140. In turn, the interface controls 166 are provided to one or more of the workspace devices 105 configured to perform and/or trigger one or more action items. In some embodiments, the interface controls 166 may be provided to the workspace devices 105 via one or more of the device interfaces 182. For example, the interface controls 166 may be presented in a device interface 182 comprising a display in the form of an image, text, and/or notification.

In some embodiments, the action items may be triggers to perform one or more operations to at least partially fulfill one or more intents behind the audio data 140. The action items may be mapped to one or more interface controls 166. Each interface controls 166 may comprise one or more action items to complete, perform, and/or trigger one or more communication operations 104. The action items may be one or more operations, commands, and/or triggers to be performed in association with one or more of the workspace devices 105. The possible interface properties 164 may be possible recommendation modifications presented to one or more of the workspace devices 105 based on the summaries 136. The possible recommendation modifications may comprise one or more dynamic configuration commands to modify the one or more entitlements 156 via the interface controls 166. In one or more embodiments, the dynamic configuration commands may comprise one or more application configuration parameters configured to control operations of the services 158 (e.g., applications). Each of the application configuration parameters may be configured to dynamically provide control information to perform one or more of the operations based at least in part upon the evaluated audio data 140.

The one or more interface properties 164 may be one or more communication commands configured to interact with the summaries 136. Herein, the interface properties 164 may be one or more interactive elements that may aid in presentation, visualization, and/or expansion of an intent associated with one or more summaries 136. For example, the interface properties 164 may be one or more data elements configured to provide information to the workspace devices 105.

The one or more interface controls 166 may be one or more visualization commands to visualize the summaries 136 in the virtual environments 135. Herein, the interface controls 166 may be one or more interactive elements configured to be rendered to represent the intent behind the summaries 136. For example, the interface controls 166 may be one or more visual elements configured to provide information to the workspace devices 105.

In one or more embodiments, the server 102 is configured to generate the interface properties 164 and the interface controls 166 in real time as the audio data 140 is obtained. Further, the server 102 may be configured to generate the interface properties 164 and/or the interface controls 166 over a period of time. As the audio data 140 is received, the server 102 may be configured to perform one or more transcription operations 138 to transcribe the audio data 140 into image data 142 and/or text data 144. The server 102 may be configured to generate the one or more summaries 136 based on the image data 142 and/or the text data 144. After generating the summaries 136, the server 102 may be configured to determine one or more interface properties 164 based on intent comprised in the summaries 136. Further, the server 102 may be configured to determine one or more interface controls 166 based on intent comprised in the summaries 136. The server 102 may be configured to generate one or more interface commands 168 that bind one or more of the interface properties 164 to one or more of the interface controls 166. At this stage, the server 102 may be configured to present the interface controls 166 to one or more of the workspace devices 105.

In some embodiments, the interface commands 168 provide triggers in the form of communication or control signals to start operations such as fetching the instructions 132 or running one or more scripts. The interface commands 168 may provide service information data indicating any services (e.g., one or more of the services 158) available in the server 102, the workspace devices 105, and the user devices 106. The interface commands 168 may provide lists, security information, and configuration parameters that the server 102 uses to set up a communication operation 104. The interface commands 168 may be configuration data that provides starting procedure configuration to the server 102. In one or more embodiments, the interface commands 168 may be optimized instructions that enable establishing of a specific procedure in the workspace devices 105 and/or the user devices 106. The interface commands 168 may be configured to generate one or more configuration parameters to render the interface controls 166 in the device interfaces 182.

In one or more embodiments, the analysis architecture 170 comprises the ML algorithms 172, the AI commands 174, and the ML models 176. The ML algorithms 172 may be executed by the server processor 126 to evaluate the audio data 140 and/or perform one or more of the communication operations 104 in accordance with one or more ML models 176. Further, the ML algorithms 172 may be configured to interpret and transform the audio data 140, the image data 142, and/or the text data 144 into structured data sets and subsequently stored as files or tables. The ML algorithms 172 may cleanse, normalize raw data, and derive intermediate data to generate uniform data in terms of encoding, format, and data types. The ML algorithms 172 may be executed to run user queries and advanced analytical tools on the structured data. The ML algorithms 172 may be configured to generate the one or more AI commands 174 based on a current service 158 and the existing interface commands 168. In turn, the server processor 126 may be configured to generate the interface controls 166 and determine the interface properties 164 based on the outputs of the ML algorithms 172. The AI commands 174 may be parameters that modify the interface controls 166 and the interface properties 164. The AI commands 174 may be combined with the existing interface commands 168 to create the interface controls 166 and the interface properties 164.

Network

The network 110 facilitates communication between and amongst the various devices of the system 100. The network 110 may be any suitable network operable to facilitate communication between the server 102, the workspace devices 105, and the user devices 106 of the system 100. The network 110 may include any interconnecting system capable of transmitting audio, video, signals, data, data packets, messages, or any combination of the preceding. The network 110 may include all or a portion of a public switched telephone network (PSTN), a public or private data network, a LAN, a MAN, a WAN, a local, regional, or global communication or computer network, such as the Internet, a wireline or wireless network, an enterprise intranet, or any other suitable communication link, including combinations thereof, operable to facilitate communication between the devices.

Workspace Devices

In one or more embodiments, each of the workspace devices 105 (e.g., the workspace devices 105*a*-105*d*) may be any computing device configured to communicate with other devices, such as the server 102, other workspace devices 105 in additional workspace device groups 111, the user devices 106 in the user device group 113, other user devices 106 in additional user devices 106, databases, and the like in the system 100. Each of the workspace devices 105 may be configured to perform specific functions described herein and interact with one or more workspace devices 105*b*-105*d* in the user device group 113. Examples of the workspace devices 105 comprise, but are not limited to, a laptop, a computer, a smartphone, a tablet, a smart device, an IoT device, a simulated reality device, an augmented reality device, or any other suitable type of device. In some embodiments, the workspace devices 105 may be associated with one or more of the communication groups 133. In this regard, each of the workspace devices 105 may be associated with one or more specific roles 134 within an organization. Further, each of the workspace devices 105 may comprise access and/or connectivity to one or more elements of the messaging network in accordance with corresponding device roles 134.

The workspace devices 105 may be hardware configured to create, transmit, and/or receive information. The workspace devices 105 may be configured to receive inputs from a user, process the inputs, and generate data information or command information in response. The data information may include documents or files generated using a user interface. The command information may include input selections/commands triggered by a user using a peripheral component or one or more device peripherals 184 (i.e., a keyboard) or an integrated input system (i.e., a touchscreen presenting a user interface). The workspace devices 105 may be communicatively coupled to the server 102 via a network connection (i.e., one or more of the device interfaces 182). The workspace devices 105 may transmit and receive data information, command information, or a combination of both to and from the server 102 via the device interfaces 182. In one or more embodiments, the workspace devices 105 is configured to exchange data, commands, and signaling with the server 102. In some embodiments, the workspace devices 105 are configured to trigger the start of one or more communication operations. The workspace devices 105 may be configured to trigger network devices to perform one or more communication operations. In one or more embodiments, while FIG. 1 shows the workspace device 105*b*, the workspace device 105*c*, and the workspace device 105*d*, a given workspace device group 111 may comprise less or more workspace devices 105.

In one or more embodiments, referring to the workspace device 105*a* as a non-limiting example of the workspace devices 105, the workspace device 105*a* may comprise one or more device interfaces 182, one or more device peripherals 184, a device processor 186, and a device memory 190. The device interfaces 182 may be any suitable hardware or software (e.g., executed by hardware) to facilitate any suitable type of communication in wireless or wired connections. These connections may comprise, but not be limited to, all or a portion of network connections coupled to additional workspace devices 105*b*-105*d*, the server 102, the user devices 106, the Internet, an Intranet, a private network, a public network, a peer-to-peer network, the public switched telephone network, a cellular network, a LAN, a MAN, a WAN, and a satellite network. The device interfaces 182 may be configured to support any suitable type of communication protocol.

In one or more embodiments, the one or more device peripherals 184 may comprise audio devices (e.g., speaker, microphones, and the like), input devices (e.g., keyboard, mouse, and the like), or any suitable electronic component that may provide a modifying or triggering input to the workspace device 105*a*. For example, the one or more device peripherals 184 may be speakers configured to release audio signals (e.g., voice signals or commands) during media playback operations. In another example, the one or more device peripherals 184 may be microphones configured to capture audio signals from the agent 112*a*. In one or more embodiments, the one or more device peripherals 184 may be configured to operate continuously, at predetermined time periods or intervals, or on-demand.

The device processor 186 may comprise one or more processors communicatively coupled to and in signal communication with the device interfaces 182, the device peripherals 184, and the device memory 190. The device processor 186 is any electronic circuitry, including, but not limited to, state machines, one or more CPU chips, logic units, cores (e.g., a multi-core processor), FPGAs, ASICs, or DSPs. The device processor 186 may be a programmable logic device, a microcontroller, a microprocessor, or any suitable combination of the preceding. The one or more processors in the device processor 186 are configured to process data and may be implemented in hardware or software executed by hardware. For example, the device processor 186 may be an 8-bit, a 16-bit, a 32-bit, a 64-bit, or any other suitable architecture. The device processor 186 comprises an ALU to perform arithmetic and logic operations, processor registers that supply operands to the ALU, and store the results of ALU operations, and a control unit that fetches software instructions such as device instructions 192 from the device memory 190 and executes the device instructions 192 by directing the coordinated operations of the ALU, registers, and other components via a device processing engine (not shown). The device processor 186 may be configured to execute various instructions. For example, the device processor 186 may be configured to execute the device instructions 192 to implement functions or perform operations disclosed herein, such as some or all of those described with respect to FIGS. 1-3. In some embodiments, the functions described herein are implemented using logic units, FPGAs, ASICs, DSPs, or any other suitable hardware or electronic circuitry.

In one or more embodiments, the device memory 190 may comprise multiple local operation data and one or more local applications associated with the server 102. The local operation data may be data configured to enable one or more data processing operations such as those described in relation with the server 102. The local operation data may be partially or completely different from those comprised in the server memory 130. The local applications may be one or more of the services described in relation with the server 102. In some embodiments, the local applications may be partially or completely different from those comprised in the server memory 130.

User Devices

In one or more embodiments, each of the user devices 106 (e.g., the user devices 106*a*-106*c*) may be any computing device configured to communicate with other devices, such as the server 102, the workspace device 105*a*, the workspace devices 105*b*-105*d* in the workspace device group 111, other user devices 106 in other user device groups 113, databases, and the like in the system 100. Each of the user devices 106 may be configured to perform specific functions described herein and interact with one or more user devices 106*a*-106*c* in the user device group 113. Examples of the user devices 106 comprise, but are not limited to, a laptop, a computer, a smartphone, a tablet, a smart device, an IoT device, a simulated reality device, an augmented reality device, or any other suitable type of device. The user devices 106 may comprise some of capabilities described in reference to the workspace device 105*a*. In some embodiments, while FIG. 1 shows the user device 106*a*, the user device 106*b*, and the user device 106*c*, a given user device group 113 may comprise less or more workspace devices 105.

Operational Flow to Transform Audio Data

FIG. 2 shows an operational flow 200 in which the system 100 of FIG. 1 is configured to transform audio data 140, in accordance with one or more embodiments. In FIG. 2, the operational flow 200 comprises multiple operations 202-206. The operational flow 200 may be performed between a user device 106*a* associated with a user 114*a* and an agent 112*a* associated with a workspace device 105*a*. The operational flow 200 shows the transformation operations 202 comprising one or more sound capture operations 210, one or more natural language processing operations 212, one or more summarization operations 214, and one or more text analysis operations 216. The operational flow 200 shows the control creation operations 204 comprising one or more prediction operations 220, one or more data transformation operations 222, one or more interface generation operations 224, and one or more rendering operations 226. The operational flow 200 shows the presentation operations 206 comprising one or more markup operations 230, one or more override command operations 234, one or more data binding operations 236, and one or more modification operations 238.

In one or more embodiments, the transformation operations 202 may be one or more operations configured to convert audio data 140 to image data 142 and/or text data 144. In the transformation operations 202, the sound capture operations 210 may comprise live listening to sounds during one or more communication operations 104, obtaining audio data 140 from the captured sounds, and storing the audio data 140 in a storage location and/or database. The natural language processing operations 212 may be one or more operations comprising regressive machine learning analysis configured to determine natural language patterns in the captured sounds. The natural language processing operations 212 may comprise generating one or more logical language associations based on key words extracted from the audio data 140. The summarization operations 214 may comprise one or more operations configured to generate the summaries 136. The summarization operations 214 may comprise one or more triggers configured to extrapolate intent from the audio data 140. The text analysis operations 216 may be extensions of the summarization operations 214 configured to emphasize action items derived from the summaries 136. In some embodiments, the sound capture operations 210, the natural language processing operations 212, the summarization operations 214, and the text analysis operations 216 may be performed in any order other than the order shown in FIG. 2. In some embodiments, the transformation operations 202 may generate the summaries 136 as outputs to be transmitted to the control creation operations 204.

In one or more embodiments, the control creation operations 204 may be one or more operations configured to generate the interface properties 164 and the interface controls 166 based on the summaries 136. In some embodiments, the control creation operations 204 may receive the summaries 136 as inputs from the transformation operations 202. In the control creation operations 204, the prediction operations 220 may be one or more operations configured to predict future intents that may be associated with the one or more summaries 136. The prediction operations 220 may be configured to generate one or more predicted actions that may result from the audio data 140 associated with the summaries 136. The data transformation operations 222 may be configured to transform the image data 142 and/or the text data 144 from an existing format comprising a first order of words to a subsequent format comprising a second order of words. For example, the data transformation operations 222 may transform multiple sentences in the summaries 136 into one sentence providing insight into one or more intents associated with the audio data 140. The interface generation operations 224 may comprise one or more operations configured to determine the interface properties 164 and the interface controls 166. The server 102 may be configured to execute the machine learning algorithm 172 to dynamically derive one or more interface properties 164 based on the summaries 136. As described above, the interface properties 164 may be one or more defining aspects of action items that may be performed upon interaction with one or more of the interface controls 166. In turn, the interface controls 166 may be one or more interactive elements and/or visual elements that are representative of intent in the summaries 136. The rendering operations 226 may be one or more operations configured to render, create, and/or replicate interface controls 166. In some embodiments, the prediction operations 220, the data transformation operations 222, the interface generation operations 224, and the rendering operations 226 may be performed in any order other than the order shown in FIG. 2. In some embodiments, the control creation operations 204 may generate the interface properties 164 and the interface controls 166 as outputs to be transmitted to the presentation operations 206.

In one or more embodiments, the presentation operations 206 may be one or more operations configured to present one or more interface controls 166 in one or more virtual environments 135 based on the interface properties 164 and the interface controls 166. In some embodiments, the presentation operations 206 may receive the interface properties 164 and the interface controls 166 as inputs from the control creation operations 204. In the presentation operations 206, the markup operations 232 may comprise one or more operations configured to receive triggers to modify the rendered interface controls 166 and/or the interface properties associated with rendered interface controls 166. The markup operations 232 may be triggered based on inputs received via the one or more server I/O interfaces 120 and/or received from the one or more workspace devices 105. The override command operations 234 may be configured to implement one or more override commands 146 configured to modify, change, eliminate, and/or add elements in the interface controls 166. For example, an interface control 166 indicating a pie chart comprising interface properties 164 configured to expand each section of the pie chart may receive one or more override the appearance of the pie chart to display specific colors, modify the pie chart into a specific graph type, and/or replace the pie chart with lines of dialogue among others. The data binding operations 236 may be one or more operations configured to bind the interface properties 164 to the interface controls 166. The modification operations 238 may be configured to provide interactivity to the interface controls 166 in a specific virtual environment 135. In some embodiments, the markup operations 232, the override command operations 234, the data binding operations 236, and the modification operations 238 may be performed in any order other than the order shown in FIG. 2.

A first example of the operational flow 200 may comprise sounds obtained during a student lecture at an academic institution. In this example, a presenter may generate one or more sounds during a lecture. Herein, the server 102 may be configured to listen to the sounds generated by the presenter and extract audio data 140 from the sounds. In turn, as part of the transformation operations 202, the server 102 may be configured to execute one or more machine learning algorithms 172 (e.g., via a machine learning application programming interface (API)) to generate one or more summaries based on the audio data 140. In this case, the summaries 136 may comprise extracts of the audio data 140 and reformatted versions of the audio data 140 comprising insights and/or intents associated with the audio data 140. The insights and/or intents may comprise statistical information, quotes of importance, and/or term definitions. In this regard, the server 102 may be configured to define certain terms in the summaries 136 as determined by the server 102. At this stage, the server 102 may be configured to execute the machine learning algorithms 172 to determine one or more interface properties 164 comprising one or more interactions based on the summaries 136. For example, the interface properties 164 for the first example may be determined to be triggers to expand terms and/or provide presenter quotes associated with text in the summaries 136. The server 102 may be configured to determine one or more interface controls 166 based on the summaries 136. The interface controls 166 under the first example may comprise Gantt charts representing a sequence of events in a project and/or images obtained from a data repository representative of one or more phrases in the summaries 136. After the interface properties 164 and the interface controls 166 are determined, the interface controls 166 may be rendered and some or all of the interface properties 164 may be associated with the interface controls 166. Then, the interface controls 166 may be presented to one or more workspace devices 105. For example, the interface controls 166 may be presented in one or more virtual environments 135 comprising screens, virtual reality environments, and the like.

In one or more embodiments, a second example of the operational flow 200 may comprise sounds obtained during communication operations 104 performed during one or more data exchanges between one of the agents 112 and one or more of the users 114. Herein, the interface properties 164 may comprise data details associated with a conversation between the agents 112 and the user 114. For example, if the user 114 describes a device, the interface properties 164 may comprise one or more expansion capabilities to see internal parts of the device. Further, the interface controls 166 may comprise visual representation of the device and/or a visual representation of the device being used in a context environment and/or relevant to the summaries 136 obtained from the communication operations 104 (e.g., conversations) exchanged between a given agent 112 and a given user 114.

While the first example and the second example are described herein in some detail, these examples are non-limiting of the operations performed by the server 102.

Example Process to Transform Audio Data

FIG. 3 illustrates an example flowchart of a process 300 configured to dynamically abbreviate data, in accordance with one or more embodiments. Modifications, additions, or omissions may be made to the process 300. The process 300 may comprise more, fewer, or other operations than those shown in FIG. 3. For example, operations may be performed in parallel or in any suitable order. While at times discussed as the server 102, the workspace devices 105, the user devices 106, or components of any of thereof performing operations described in operations 302-346 in the process 300, any suitable system or components of the system 100 may perform one or more operations of the process 300. For example, one or more operations of the process 300 may be implemented, at least in part, in the form of instructions 132 of FIG. 1, stored on non-transitory, tangible, machine-readable media (e.g., a non-transitory computer readable medium such as server memory 130 of FIG. 1) that when run by one or more processors (e.g., the server processor 126 of FIG. 1) may cause the one or more processors to perform operations described in operations 302-346.

The process 300 starts at operation 302, where the server 102 obtains audio data 140 from a user device **106*a*. In some embodiments, prior to obtaining the audio data 140 from the user device 106*a*, the server 102 may be configured to identify a communication exchange between the user device 106*a* and the workspace device 105*a*. In the communication exchange, the user device 106*a* may be authenticated by the workspace device 105*a* as being entitled to access one or more services 158. For example, the server 102 may be configured to identify conversations between the user device 106*a* and the workspace device 105*a* prior to evaluating any audio data 140. At operation 304, the server 102 is configured to execute the ML algorithm 172 to transcribe the audio data 140 into image data 142 and/or text data 144. The server 102 may be configured to transcribe multiple packets of audio data 140 over time. At operation 306, the server 102 is configured to generate a request summary and/or a data summary (e.g., one of the summaries 136) based on the text data 144. The request summary may be representative of a predicted purpose associated with the audio data 140. For example, the server 102 may be configured to summarize the text data 144 down to one or two sentences to determine a current conversation purpose. There may be multiple conversation purposes over time. The summaries 136 may be representative of a predicted intent associated with the audio data 140. Each of the summaries 136 may be fed to the classification ML models 176 to predict each corresponding intent. The summarization operations may be performed with generative AI upon execution of the machine learning algorithms 172. In classification models, the server 102 may be configured to sort the text data 144 into various groups based on a most probable representation of intent dynamically inferred from the text data 144. At operation 308, the server 102 is configured to determine one or more interface properties 164 based on the summaries 136 in response to summarizing the text data 144. The interface properties may be one or more communication commands to interact with the summaries 136. At operation 310, the server 102 is configured to determine one or more interface controls 166 based on the summaries 136 and the interface properties 164. The interface controls 166 may be one or more visualization commands to visualize the summaries 136 in a virtual environment 135**.

At operation 320, the server 102 is configured to determine whether the interface control 166 is associated with a local library. The interface controls 166 may be determined out of a predefined set of assets stored in a database. The interface controls 166 may be determined out of a dynamic group of assets stored in a decentralized environment (e.g., blockchain) and/or multiple storage locations. If the server 102 determines that the interface controls 166 are not associated with a local library (e.g., NO), the process 300 proceeds to operation 332. The process 300 may conclude at operation 332, where the server 102 is configured to generate a report indicating that the interface controls 166 cannot be rendered. If the server 102 determines that the interface controls 166 are associated with a local library (e.g., YES), the process 300 proceeds to operation 342. At operation 342, the server 102 is configured to render the interface controls 166 in the virtual environment 135.

The process 300 may end at operation 344 and operation 346, where the server 102 may be configured to present the interface controls 166 along one or more action item suggestion to a workplace device 105. At operation 344, the server 102 is configured to bind the interface properties 164 to the interface controls 166. At operation 346, the server 102 is configured to present the interface controls 164 to one or more workspace devices 105. The server 102 may be configured to present the interface controls 166 along one or more action item suggestion to a device interface 182 and/or a device peripheral 184 in the workspace devices 105. In some embodiments, in response to presenting the interface controls 166 along one or more action item suggestion to the workspace devices 105, the workspace devices 105 may be configured to perform one or more update of a user interface (UI) in the workspace devices 105. Further, in response to presenting subsequent the interface controls 166 along one or more action item suggestion to the workspace devices 105, the workspace devices 105 are configured to perform additional updates to the UI. In some embodiments, the subsequent updates may comprise replacing current the interface controls 166 and/or one or more action item suggestion with newer interface controls 166. In some embodiments, the interface controls 166 may be presented based on sounds collected over one or more period of times. The period of times may at least partially overlap with one another. For example, the interface controls 166 and associated interface properties 164 may be generated based on two agents 112 having a conversation and each voice recording being processed to generate a specific interface control 166. Further, the period of times may not overlap with one another. For example, the interface controls 166 and associated interface properties 164 may be generated based on two presentations made by a presenter in academia and each voice recording being processed to generate a specific interface control 166.

SCOPE OF THE DISCLOSURE

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. An apparatus, comprising:

a memory operable to store:

a machine learning algorithm configured, when executed, to evaluate data in conjunction with one or more machine learning models; and a processor communicatively coupled to the memory and configured to:

obtain first audio data from a user device, wherein the first audio data comprises background noise and human speech; and in response to receiving the first audio data, execute the machine learning algorithm to:

filter out the background noise from the first audio data;

identify the human speech from the first audio data;

transform the human speech into a structured data set, the structured data set comprising the human speech;

transcribe the structured data set into first text data;

summarize the first text data into a first data summary, the first data summary being representative of a first predicted intent associated with the first audio data;

in response to summarizing the first text data, determine a first interface property based on the first data summary, the first interface property being one or more communication commands to interact with the first data summary;

determine a first interface control based on the first data summary and the first interface property, the first interface control comprises a visual interactive element including a plurality of sequence of events, wherein a first event represents the first predicted intent associated with the first data summary in a virtual environment;

render the first interface control in the virtual environment;

bind the first interface property to the first interface control; and present the first interface control to a workspace device.

2. The apparatus of claim 1, wherein the processor is further configured to:

prior to obtaining the first audio data from the user device, identify a communication exchange between the user device and the workspace device and wherein the user device is authenticated by the workspace device as being entitled to access one or more services during the communication exchange.

3. The apparatus of claim 1, wherein the processor is further configured to:

obtain second audio data from a user device;

in response to receiving the second audio data, execute the machine learning algorithm to:

transcribe the second audio data into second text data;

summarize the second text data into a second data summary, the second data summary being representative of a second predicted intent associated with the second audio data;

in response to summarizing the second text data, determine a second interface property based on the second data summary, the second interface property being another one or more communication commands to interact with the second data summary;

determine a second interface control based on the second data summary and the second interface property, the second interface control being one or more visualization commands to visualize the second data summary in the virtual environment;

render the second interface control in the virtual environment; and bind the second interface property to the second interface control; and present the second interface control to the workspace device.

4. The apparatus of claim 3, wherein:

the first audio data is collected over a first period of time;

the second audio data is collected over a second period of time; and the first period of time does not overlap the second period of time.

5. The apparatus of claim 3, wherein:

the first audio data is collected over a first period of time;

the second audio data is collected over a second period of time; and the first period of time at least partially overlaps the second period of time.

6. The apparatus of claim 3, wherein:

the first interface control and the second interface control are presented to the workspace device via a device interface;

in response to presenting the first interface control to the workspace device, the workspace device is configured to perform a first update of a user interface (UI) in the device interface; and in response to presenting the second interface control to the workspace device, the workspace device is configured to perform a second update of the UI in the device interface.

7. The apparatus of claim 6, wherein:

the second update comprises replacing the first interface control with the second interface control in the UI.

8. A method, comprising:

obtaining first audio data from a user device, wherein the first audio data comprises background noise and human speech; and in response to receiving the first audio data, executing a machine learning algorithm to perform one or more operations comprising:

filtering out the background noise from the first audio data;

identifying the human speech from the first audio data;

transforming the human speech into a structured data set, the structured data set comprising the human speech;

transcribing the structured data set into first text data;

summarizing the first text data into a first data summary, the first data summary being representative of a first predicted intent associated with the first audio data;

in response to summarizing the first text data, determining a first interface property based on the first data summary, the first interface property being one or more communication commands to interact with the first data summary;

determining a first interface control based on the first data summary and the first interface property, the first interface control comprises a visual interactive element including a plurality of sequence of events, wherein a first event represents the first predicted intent associated with the first data summary in a virtual environment;

rendering the first interface control in the virtual environment;

binding the first interface property to the first interface control; and presenting the first interface control to a workspace device.

9. The method of claim 8, further comprising:

prior to obtaining the first audio data from the user device, identifying a communication exchange between the user device and the workspace device and wherein the user device is authenticated by the workspace device as being entitled to access one or more services during the communication exchange.

10. The method of claim 8, further comprising:

obtaining second audio data from a user device;

in response to receiving the second audio data, executing the machine learning algorithm to perform one or more additional operations comprising:

transcribing the second audio data into second text data;

summarizing the second text data into a second data summary, the second data summary being representative of a second predicted intent associated with the second audio data;

in response to summarizing the second text data, determining a second interface property based on the second data summary, the second interface property being another one or more communication commands to interact with the second data summary;

determining a second interface control based on the second data summary and the second interface property, the second interface control being one or more visualization commands to visualize the second data summary in the virtual environment;

rendering the second interface control in the virtual environment; and binding the second interface property to the second interface control; and presenting the second interface control to the workspace device.

11. The method of claim 10, wherein:

the first audio data is collected over a first period of time;

the second audio data is collected over a second period of time; and the first period of time does not overlap the second period of time.

12. The method of claim 10, wherein:

the first audio data is collected over a first period of time;

the second audio data is collected over a second period of time; and the first period of time at least partially overlaps the second period of time.

13. The method of claim 10, wherein:

the first interface control and the second interface control are presented to the workspace device via a device interface;

in response to presenting the first interface control to the workspace device, the workspace device is configured to perform a first update of a user interface (UI) in the device interface; and in response to presenting the second interface control to the workspace device, the workspace device is configured to perform a second update of the UI in the device interface.

14. The method of claim 13, wherein:

the second update comprises replacing the first interface control with the second interface control in the UI.

15. A non-transitory computer readable medium storing instructions that when executed by a processor cause the processor to:

obtain first audio data from a user device, wherein the first audio data comprises background noise and human speech; and in response to receiving the first audio data, execute a machine learning algorithm to:

filter out the background noise from the first audio data;

identify the human speech from the first audio data;

transform the human speech into a structured data set, the structured data set comprising the human speech;

transcribe the structured data set into first text data;

summarize the first text data into a first data summary, the first data summary being representative of a first predicted intent associated with the first audio data;

in response to summarizing the first text data, determine a first interface property based on the first data summary, the first interface property being one or more communication commands to interact with the first data summary;

determine a first interface control based on the first data summary and the first interface property, the first interface control comprises a visual interactive element including a plurality of sequence of events, wherein a first event represents the first predicted intent associated with the first data summary in a virtual environment;

render the first interface control in the virtual environment;

bind the first interface property to the first interface control; and present the first interface control to a workspace device.

16. The non-transitory computer readable medium of claim 15, wherein, when executed by the processor, the instructions further cause the processor to:

prior to obtaining the first audio data from the user device, identify a communication exchange between the user device and the workspace device and wherein the user device is authenticated by the workspace device as being entitled to access one or more services during the communication exchange.

17. The non-transitory computer readable medium of claim 15, wherein, when executed by the processor, the instructions further cause the processor to:

obtain second audio data from a user device;

in response to receiving the second audio data, execute the machine learning algorithm to:

transcribe the second audio data into second text data;

summarize the second text data into a second data summary, the second data summary being representative of a second predicted intent associated with the second audio data;

in response to summarizing the second text data, determine a second interface property based on the second data summary, the second interface property being another one or more communication commands to interact with the second data summary;

determine a second interface control based on the second data summary and the second interface property, the second interface control being one or more visualization commands to visualize the second data summary in the virtual environment;

render the second interface control in the virtual environment; and bind the second interface property to the second interface control; and present the second interface control to the workspace device.

18. The non-transitory computer readable medium of claim 17, wherein:

the first audio data is collected over a first period of time;

the second audio data is collected over a second period of time; and the first period of time does not overlap the second period of time.

19. The non-transitory computer readable medium of claim 17, wherein:

the first audio data is collected over a first period of time;

the second audio data is collected over a second period of time; and the first period of time at least partially overlaps the second period of time.

20. The non-transitory computer readable medium of claim 17, wherein:

the first interface control and the second interface control are presented to the workspace device via a device interface;

in response to presenting the first interface control to the workspace device, the workspace device is configured to perform a first update of a user interface (UI) in the device interface; and in response to presenting the second interface control to the workspace device, the workspace device is configured to perform a second update of the UI in the device interface.

* * * * *